United States Patent [19]

Naumec

[11] Patent Number: 5,312,212
[45] Date of Patent: May 17, 1994

[54] AXIALLY COMPLIANT TOOL HOLDER

[75] Inventor: John R. Naumec, Willimantic, Conn.

[73] Assignee: United Technologies Corporation, Hartford, Conn.

[21] Appl. No.: 952,429

[22] Filed: Sep. 28, 1992

[51] Int. Cl.$^5$ .................................................. B23C 3/12
[52] U.S. Cl. .................................... 409/138; 409/193; 409/208; 901/41; 901/45
[58] Field of Search ............... 901/41, 45; 409/138, 409/186, 193, 206, 207, 208, 231, 232; 279/16, 126

[56] References Cited

U.S. PATENT DOCUMENTS

| | | | |
|---|---|---|---|
| 3,208,311 | 9/1965 | Pierce | 77/5 |
| 3,254,548 | 6/1966 | Gersch | 77/58 |
| 3,299,783 | 1/1967 | Mazue | 91/355 |
| 3,640,633 | 2/1972 | Gersch et al. | 408/12 |
| 3,884,590 | 5/1975 | Skrentner et al. | 408/8 |
| 4,332,066 | 6/1982 | Hailey et al. | 29/26 R |
| 4,412,465 | 11/1983 | Wright | 82/1.2 |
| 4,637,775 | 1/1987 | Kato | 414/744 |
| 4,784,540 | 11/1988 | Underhaug | 409/138 |
| 4,860,500 | 8/1989 | Thompson | 51/165.77 |
| 4,991,274 | 2/1991 | Fortier et al. | 279/16 |
| 4,993,896 | 2/1991 | Dombrowski et al. | 409/138 |
| 5,146,670 | 9/1992 | Jones | 29/561 |

FOREIGN PATENT DOCUMENTS 276647 3/1990 German Democratic Rep. ... 901/45
249519 12/1985 Japan ......................................... 901/41

OTHER PUBLICATIONS

Harper Surface Finishing Systems–"Multi-Axis Smart Flexible Finishing Cell" Form MM-1.
Kappa-One K-1, Yamaha Polishing Robot, Yamaha Corporation, Industrial Engineering Division, 6 pages.
Z-1, Yamaha Deburring Robot, Yamaha Corporation, 2 pages.

*Primary Examiner*—Daniel W. Howell

[57] ABSTRACT

An axially compliant tool assembly for a programmable position controller is disclosed. Various construction details have been developed which provide a responsive means to make the tool axially compliant to deviations between the programmed path of the tool and the surface being worked upon by the tool. In one particular embodiment, the axially compliant means includes a base, a sleeve axially movable relative to the base, a tool disposed on an internally splined shaft, and a radial bearing disposed between the shaft and the sleeve. The sleeve includes a flange which defines in part two sealed cavities wherein the differential pressure between the two sealed cavities provides a working force for the tool and wherein the flange may move axially within the limits of the sealed cavities.

19 Claims, 2 Drawing Sheets

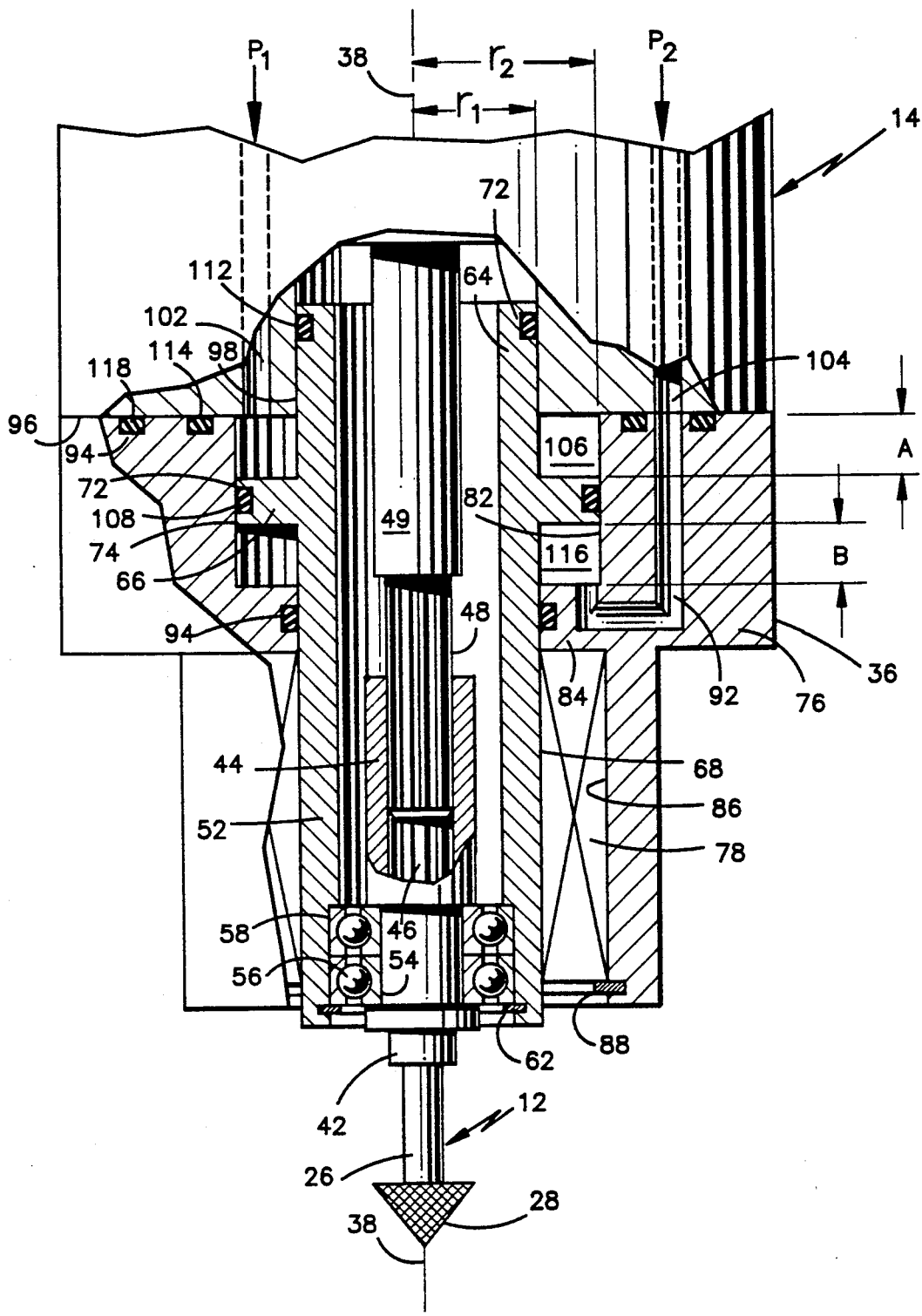

AXIALLY COMPLIANT TOOL HOLDER

This invention was made under a Government contract and the Government has rights herein.

TECHNICAL FIELD

This invention relates to a programmable position controller, and more particularly, to a method and apparatus for mounting a tool to an arm of the controller.

BACKGROUND ART

Programmable position controllers, such as robots, have proven very useful in performing routine and repetitive tasks in the manufacturing area. One such task is the deburring of the edges of machined, metallic objects. A robotic arm may be fitted with a deburring tool and programmed to follow a path around the edge of the metallic object which is to be deburred. An improvement in quality and consistency of the deburring process may result from the use of a robotic deburring.

There are, however, difficulties associated with the use of robotically controlled deburring tools. Since the programmed path of the robotic arm is in essence a series of incremental steps, there are errors in the path of the robotically controlled deburring tool relative to the surface to be machined. In addition, the surface itself may have cavities within and/or protrusions extending from it. These pockets and protrusions interfere with the path and cutting force of the robotic tool. A protrusion will urge the cutting surface of the deburring tool out of its path and cause a consequent increase in cutting force. The increased cutting force may cause and the cutting surface to cut too far into the surface. Additionally, the increased cutting force may cause damage to the cutting surface of the tool. A cavity may cause the deburring tool to separate or diverge from the surface to be machined. The separation of the cutting surface of the tool from the machined surface will prevent the deburring of that portion of the machined surface from being accomplished. The quality of the deburring and of the product being produced will thereby suffer.

A well known solution to the inaccuracy in the programmed path and to the surface variations is to build compliance into the robotic arm. Compliance compensates for errors in the path and variations in the surface by permitting limited movement of the tool while maintaining an acceptable cutting force. In this way, variations in the surface or inaccuracies in the programmed path which are within the limits of the compliance will be accommodated and damage to the cutting surface and the finished product may be minimized.

Several types of compliant tool holders have been disclosed in the prior art. In U.S. Pat. No. 4,637,775, issued to Hisso Kato, entitled "Industrial Robot Device", compliance is provided by a spring built into the device holding the tool. The spring permits the tool, which is comprised of the cutting surface and the drive means for the cutting surface, to move laterally, relative to the axis of the tool, away from the edge. In U.S. Pat. No. 4,860,500, issued to Robert Thompson, entitled "Passive Actuator To Maintain A Constant Normal Cutting Force During Robotic Deburring", an air cylinder with a low friction piston is used to provide a zero spring rate compliance. As with Kato, the cutting surface and the drive means of the tool are permitted to move laterally to accommodate path errors and surface variations. A drawback to both types of lateral compliance is that in precision machining there may not be room to permit sideways compliance. For instance, structure adjacent to the edge being deburred may preclude the use of a sideways compliant tool holder. In addition, the sensitivity of the compliance mechanisms has been insufficient for intricate patterns of machining. The weight associated with the prior art compliant tool holders has been too great to provide a tool holder which is responsive to changes in path or to variations in the machined surface. In effect, the momentum of the compliant tool holders results in additional cutting surface path variations.

The above art notwithstanding, scientists and engineers under the direction of Applicant's Assignee are working to develop compliant robotic tool holders.

DISCLOSURE OF THE INVENTION

According to the present invention, a device for holding a tool in operable relation to a controller includes a longitudinal axis, an axially slidable sleeve, and force applying means, wherein the sleeve is adapted to axially secure a tool to the sleeve and the force applying means is adapted to permit limited axial motion of the sleeve while maintaining a constant axially directed working force on the tool.

According to a specific embodiment of the present invention, the device includes a base adapted to be fixed to a controller, the controller including drive means for a tool to be held the tool holder, the sleeve includes a radially outwardly extending flange wherein the flange defines in part a first sealed cavity being in fluid communication with a first source of pressurized fluid and a second sealed cavity disposed axially opposite the flange and being in fluid communication with a second source of pressurized fluid, and wherein the differential pressure between the two sealed cavities is maintained constant as the size of the two sealed cavities varies with axial motion of the sleeve.

A primary feature of the present invention is the axial compliance of the tool. Another feature is the separation between the axially compliant tool and the drive means for the tool. A further feature is the use of differential pressure between the two cavities as the force applying means.

A primary advantage of the present invention is the ability to machine in areas having adjacent obstructions as a result of the axial, rather than lateral or pivotal, compliance. Another advantage is the simplicity of the programmed path of the tool as a result of the tool being disposed normal to the edge being machined. A further advantage is the sensitivity of the compliant tool holder as a result of the mounting of the tool directly to the compliant device. By making the tool compliant, rather than the tool and drive means, the compliant components of the tool holder have reduced weight and thereby reduced momentum. In this way, the compliance is much more responsive and sensitive to errors in the tool path and variations in the machined surface. A still further advantage of the present invention is the control and sensitivity of the working force as a result of using differential pressure to provide the working force to the tool. A constant working force is much easier to maintain using differential pressure rather than a single source of pressure or a spring force.

"Controller" is defined herein to be any of the class of programmable position controllers, such as robots or numerically controlled machines. The invention may be integral to the controller or may be a detachable device added to the controller for specific applications.

The foregoing and other objects, features and advantages of the present invention will become more apparent in light of the following detailed description of the exemplary embodiments thereof, illustrated in the accompanying drawings.

BRIEF DESCRIPTION OF THE DRAWINGS

FIG. 2 is a partially cut away side view of a tool holder and tool.

BEST MODE FOR CARRYING OUT THE INVENTION

Figure 1:
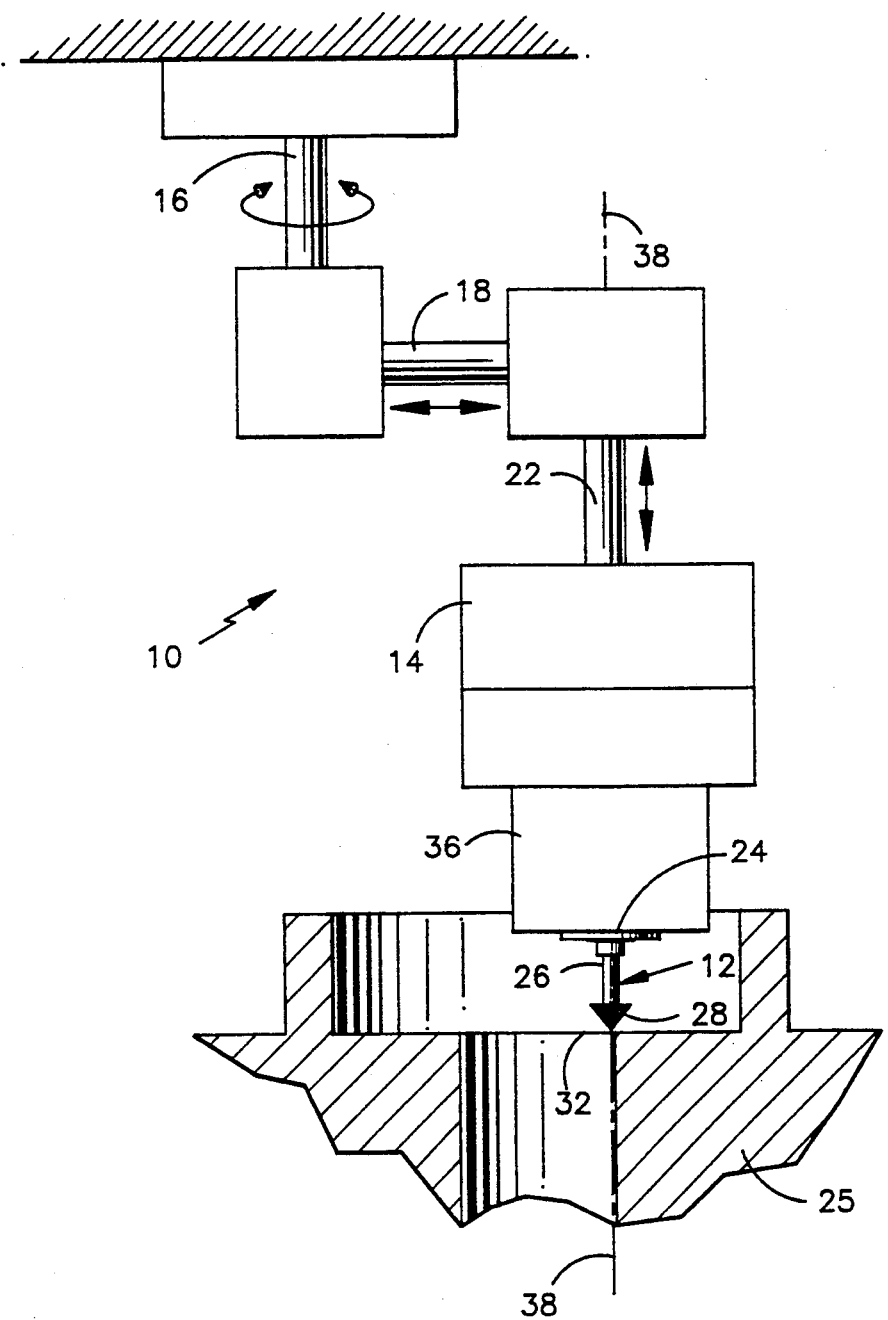
FIG. 1 is a side view of a robotic device equipped with a tool for machining the edge of an object.

FIG. 1 illustrates a robotic device 10 having a tool assembly 12 attached to an arm 14. The robotic device includes means 16 for rotational movement, means 18 for lateral extension, and means 22 for longitudinal extension which, in conjunction, manipulate the spacial positioning of the tool assembly. The robotic device as shown is merely representative of robotic means adapted for positioning a tool in three dimensional space and to be programmed to move such a tool through a predetermined path.

The tool assembly is attached to a distal end 24 of the arm and provides means for performing work on an object 25. As shown in FIG. 1, the means for performing work is a deburring tool 26 having a cutting surface 28 and the object includes an edge 32 to be deburred and structure 34 which extends adjacent to the edge to be deburred. The adjacent structure presents an obstruction that prevents the use of tool assemblies which are canted or angled relative to the longitudinal axis. In effect, the edge and the adjacent structure are representative of an object to be deburred that presents a working path for the tool assembly which limits or does not permit lateral movement of the tool assembly. In addition, keeping the tool assembly at a constant angle relative to the longitudinal axis as the tool assembly travels around the edge requires an extremely complex path to be programmed into the robotic device. Since robotic devices program the path in incremental linear steps, the precision of the programmed path relative to the edge suffers.

In accordance with the present invention, as illustrated in FIG. 1, the tool assembly includes means 36 to provide compliance to the tool. Compliant means 36 permits the cutting surface of the tool to move relative to the edge to be deburred to accommodate inaccuracies in the programmed path relative to the edge. As shown in FIG. 1, the compliance is directed axially relative to a longitudinal axis 38 of the tool assembly. The axially compliant means also permits the working force provided to the tool to remain constant as the cutting surface moves along the surface being worked upon. In this way, errors in the programmed path of the tool and unanticipated fluctuations in the edge are accommodated without a significant variation in cutting force and without a need for lateral movement of the cutting surface.

The axially compliant means is illustrated in more detail in FIG. 2. The axially compliant means is disposed between the tool and the drive means for the tool. The tool is attached to the axially compliant means by a collet assembly 42 which is attached to a tool shaft 44. The tool shaft has an internally splined surface 46 which is engaged with an externally splined surface 48 of the drive shaft. The drive shaft is engaged with the tool drive means. As shown in FIG. 2, engagement between the splined surfaces of the tool shaft and drive shaft provide means to transfer rotational force from the drive means through the drive shaft and the tool shaft and to the tool. The collet assembly provides means to attach the tool to the axially compliant means and the tool shaft.

The splined surface of the tool shaft permits relative axial motion between the tool shaft and drive shaft. The tool shaft, and thereby the collet assembly and tool attached to the tool shaft, are axially restrained relative to the axially compliant means by engagement of the tool shaft with a sleeve 52. The tool shaft includes a radial bearing surface 54 which is engaged with a radial bearing assembly 56. The radial bearing assembly is axially retained to the sleeve by a cylindrical cutout 58 in the sleeve and a snap-ring 62. The radial bearing assembly permits relative rotational motion between the tool shaft and the sleeve while axially retaining the tool shaft relative to the sleeve.

The sleeve is hollow and extends longitudinally from the tool drive means to the tool. The sleeve includes an axially inward portion 64 slidably engaged with the tool drive means, a flange 66 extending radially outward from the sleeve, a linear bearing surface 68, and a plurality of circumferentially oriented O-ring slots 72. The flange includes an outer end 74 which is slidably engaged with a base 76. The linear bearing surface is slidably engaged with a linear bearing 78.

The base includes a flange contact surface 82, an axial stop 84, and a circumferential cutout 86 adapted to fit the linear bearing. The linear bearing is retained within the circumferential cutout by a snap-ring 88. The linear bearing provides means to permit axially directed sliding motion between the sleeve and the base. The base also includes a base flowpath 92 and a plurality of circumferentially oriented O-ring slots 94. The base is attached to a mating surface 96 of the tool drive means.

The tool drive means includes means for generating a rotational force (not shown), a sleeve contact surface 98, a high pressure fluid flow passage 102, and a low pressure fluid flow passage 104. The low pressure fluid flow passage is in fluid communication with the base flow passage.

The axial separation between the flange and the mating surface and the radial separation between the sleeve and the base define a first annular sealed cavity 106. The first sealed cavity is in fluid communication with the high pressure flow passage of the tool drive means. Sealing means for the first cavity is provided by engagement between a flange O-ring 108 and the flange contact surface, engagement between a sleeve O-ring and 112 the sleeve contact surface, and engagement between a first base O-ring 114 and the mating surface.

The axial separation between the flange and the axial stop and the radial separation between the sleeve and the flange contact surface defines a second sealed cavity 116. The second sealed cavity is in fluid communication with the base flow passage. Sealing means for the second sealed cavity provided by the engagement of the flange O-ring with the flange contact surface and engagement between a second base O-ring 118 and the sleeve. In addition, sealing means for the juncture between the base flow passage and the low pressure flow passage is provided by the engagement by the first base O-ring and the mating surface and engagement by a third base O-ring 120 and the mating surface.

During operation, the drive means generates a rotational force which is transferred sequentially to the drive shaft, to the tool shaft, to the collet assembly, and to the tool. Rotation of the tool provides for relative motion between the cutting surface of the tool and the edge of the object being worked upon. The differential pressure between the two sealed cavities provides an axially directed force and defines means to apply force to the tool. This differential pressure is the difference between the pressure $P_1$ of the fluid flowing through the high pressure flow passage into the first sealed cavity and the pressure $P_2$ of the fluid flowing through the low pressure flow passage, through the base flow passage, and into the second sealed cavity ($P_2-P_1$). The pressure $P_1$ of the first sealed cavity generates an axially directed force equal to the pressure $P_1$ multiplied by the surface area of the flange bordering the first sealed cavity ($\pi \times (R_2-R_1)^2$). An oppositely directed axially force is provided by the pressure $P_2$ of the second sealed cavity upon the surface of the flange bordering the second sealed cavity. The difference between these two axially directed forces is the working force upon the tool. Although described as a differential pressure generated by the pressurized fluids, it should be apparent to those skilled in the art that in many applications a gaseous fluid may be preferred as a result of its inherent compressibility.

As the cutting surface of the tool travels over the edge to be deburred, variations between the programmed path of the cutting surface and the edge may cause either separations between the cutting surface and the edge or increase the reactive force of the edge to the cutting surface of the tool. The axially compliant means provides a constant axially directed work force between the cutting surface of the tool and the edge. The constant work force is maintained by permitting axial movement of the tool relative to the tool assembly. The axial motion is accomplished by the sliding of the sleeve relative to the tool drive means, the base, and the linear bearing. The axially directed work force is maintained constant by monitoring the pressure $P_1$ and $P_2$ and adjusting $P_1$ and $P_2$ to maintain a constant differential pressure between the two sealed cavities. A suggested means of maintaining a constant pressure differential is to provide pressure accumulators (not shown) as the sources of pressures $P_1$ and $P_2$ and which have a large volume relative to the volume of the sealed cavities. In this way changes in the volume of the sealed cavities will have neglible effects on the pressure within the accumulators and thereby the pressure within the sealed cavities. Another means to maintain a constant pressure differential is to monitor the pressure within the cavities and to adjust the pressures $P_1$ and $P_2$ in response to changes in pressure within the sealed cavities.

The precision of the cutting of the edge is provided by the limits of the axial motion of the tool. As shown in FIG. 2, the sleeve is initially positioned such that it may travel axially a distance A to accommodate obstructions along the edge and a distance B to accommodate unexpected separations between the cutting surface and the edge. For many applications, the flange will be initially positioned centrally between the axial stop of the base and the mating surface. In this position, the size of the first sealed cavity is equal to the size of the second sealed cavity and the axial distance A is equal to the axial distance B.

It should be noted that the axial compliant means is disposed between the tool and the drive means for the tools. This arrangement eliminates the drive means from the compliant or moving parts of the tool assembly. Limiting the axially compliant parts to the tool, collet, tool shaft, radial bearing, and sleeve minimizes the weight of the axially compliant parts of the tool assembly and thereby increases the sensitivity of the tool. The increased sensitivity is a result of the reduced momentum (mass $\times$ velocity$^2$) of the compliant parts. The increased sensitivity permits the tool to react responsively to deviations in the path and/or edge being cut.

Although the invention has been shown and described with respect to detailed embodiments thereof, it should be understood by those skilled in the art that various changes, omissions, and additions may be made therein and thereto, without departing from the spirit and scope of the invention.

I claim:

1. A device for holding a tool in operable relationship to a programmable position controller such that the tool engages an object being worked upon, the controller including an arm, means to position the arm, a tool support frame disposed on the arm and having a longitudinal axis, a drive shaft, drive means disposed on the arm to impart rotational motion to the drive shaft, the device including:

a tool shaft assembly in operable relationship with the drive shaft such that rotational force is transformed from the drive shaft to the tool shaft assembly and such that longitudinal motion of the tool shaft assembly relative to the drive shaft is permitted within a range of compliance defined by axial limits;

means to engage the tool shaft assembly with the tool; and force applying means adapted to position the tool shaft assembly within the axial limits and to provide an axially directed work force to the tool;

wherein the relative longitudinal motion provides axial compliance to the tool to accommodate differences between the programmed positioning of the tool and the surface of the object being worked upon, and wherein the force applying means maintains a work force throughout the range of axial compliance.

2. The device according to claim 1, wherein the device is disposed longitudinally between the tool and the drive means such that the device permits relative longitudinal motion between the tool and drive means.

3. The device according to claim 1, wherein the force applying means includes a first sealed cavity defined in part by the tool shaft assembly and a second sealed cavity defined in part by the tool shaft assembly, the first sealed cavity in fluid communication with a first source of pressurized fluid having a pressure $P_1$, the second sealed cavity in fluid communication with a second source of pressurized fluid having a pressure $P_2$, wherein the cavities share a common cavity wall disposed in a fixed relationship to the tool shaft assembly, wherein the work force is proportional to the differential pressure between the two sealed cavities, wherein contact between the tool and object being worked upon produces a reactive force, and wherein the axial position of the tool depends upon the difference between the work force and the reactive force.

4. The device according to claim 3, wherein the device is disposed longitudinally between the tool and the drive means such that the device permits relative longitudinal motion between the tool and drive means.

5. The device according to claim 1, further including releasable attachment means adapted to attach the device to the controller such that in an attachment position the tool shaft assembly engages the drive shaft, wherein the attachment means may be released such that the device is removable from the controller to permit engagement of the tool directly to the controller.

6. The device according to claim 3, further including releasable attachment means adapted to attach the device to the controller such that in an attachment position the tool shaft assembly engages the drive shaft, wherein the attachment means may be released such that the device is removable from the controller to permit engagement of the tool directly to the controller.

7. A device for holding a tool in operable relationship to a programmable position controller such that the tool engages an object being worked upon, the controller including an arm, means to position the arm, a tool support frame disposed on the arm and having a longitudinal axis, a mating surface, a first source of pressurized fluid having a static pressure $P_1$, a second source of pressurized fluid having a pressure $P_2$, a drive shaft, drive means disposed on the arm and in operable relation to the drive shaft to impart rotational motion to the drive shaft, the drive shaft extending axially from the tool support frame and having a distal end with a first splined surface, the device including:
 a base mounted to the mating surface of the tool support frame and extending axially therefrom, the base being longitudinally hollow and including fastening means adapted to mount the base to the tool support frame, a jam extending radially inward from the base, and a radially inward facing flange contact surface;
 a sleeve disposed within the base and adapted to be axially movable relative to the base, the axially inward end of the sleeve being in sliding, sealed contact with the tool support frame, the sleeve being in sliding and sealing contact with the radially inward end of the jam, the sleeve having a flange extending radially outward from the sleeve, wherein the radially outward end of the flange and the flange contact surface are engaged in sliding, sealed contact, the flange positioned axially between the jam and the mating surface, thereby defining a first sealed cavity between the flange and the mating surface and a second sealed cavity between the flange and the jam, the first sealed cavity being in fluid communication with the first source of pressurized fluid, the second sealed cavity being in fluid communication with the second source of pressurized fluid, and the sleeve further having a bearing surface;
 a linear bearing disposed radially between the sleeve and the base, the bearing secured to the base and in sliding contact with the bearing surface of the sleeve;
 a tool shaft disposed radially inward of the sleeve and having a splined end adapted to engage the splined end of the drive shaft to transfer rotational force from the drive shaft to the tool shaft;
 a radial bearing extending between the tool shaft and the sleeve, the radial bearing having an outer race mounted on the sleeve and an inner race mounted on the tool shaft;
 a collet disposed in a fixed relationship to the end of the tool shaft opposite the splined end and adapted to hold the tool;
 wherein a working force is directed axially toward the object to be worked upon, the working force being proportional to the differential pressure between the two sealed cavities, wherein contact between the tool and the object to be worked upon produces a reactive force, wherein the axial position of the tool, relative to the base, depends upon the difference between the working force and the reactive force, with a positive difference, defined as a working force greater than the reactive force, causes the tool to be extended axially outward and a negative difference, defined as a working force less than the reactive force, causes the tool to retract axially, with a minimum axial extension of the tool corresponding with the flange abutting the mating surface and the maximum axial extension of the tool corresponding with the flange abutting the jam.

8. A robotic device having a positionable distal end, the robotic device including a tool holder disposed on the distal end, the tool holder having a longitudinal axis and being adapted to provide axial compliance to a tool during use of the tool, the tool holder including a sleeve in sliding relationship with the distal end, wherein the sliding motion is axially directed and limited by engagement with the distal end, the sleeve adapted to secure a tool such that the tool is axially fixed relative to the sleeve, and force applying means adapted to position the sleeve within axial limits and to provide an axially directed working force to the tool.

9. The robotic device according to claim 8, wherein the device is disposed longitudinally between the tool and the drive means such that the device permits relative longitudinal motion between the tool and the drive means.

10. The robotic device according to claim 8, wherein the force applying means includes a first sealed cavity defined in part by the tool shaft assembly and a second sealed cavity defined in part by the tool shaft assembly, the first sealed cavity in fluid communication with a first source of pressurized fluid having a pressure $P_1$, the second sealed cavity in fluid communication with a second source of pressurized fluid having a pressure $P_2$, wherein the cavities share a common cavity wall disposed in a fixed relationship to the tool shaft assembly, wherein the work force is proportional to the differential pressure between the two sealed cavities, wherein contact between the tool and object being worked upon produces a reactive force, and wherein the axial position of the tool depends upon the difference between the work force and the reactive force.

11. The robotic device according to claim 10, wherein the device is disposed longitudinally between the tool and the drive means such that the device permits relative longitudinal motion between the tool and the drive means.

12. The robotic device according to claim 8, further including releasable attachment means adapted to attach the device to the controller such that in an attached position the tool shaft assembly engages the drive shaft, wherein the attachment means may be released such that the device is removable from the controller to permit engagement of the tool directly to the controller.

13. The robotic device according to claim 10, further including releasable attachment means adapted to attach the device to the controller such that in an attached position the tool shaft assembly engages the drive shaft, wherein the attachment means may be released such that the device is removable from the controller to permit engagement of the tool directly to the controller.

14. A tool holder for use with a robotic device, the tool holder having a longitudinal axis and adapted to provide axial compliance to a tool during use of the tool, the tool holder including a base adapted to be fixed to the robotic device and a sleeve in sliding relationship with the base, wherein the sliding motion is axially directed and limited by engagement with the base, the sleeve adapted to secure a tool such that the tool is axially fixed relative to the sleeve, and force applying means adapted to position the sleeve within the axial limits and to provide an axially directed working force to the tool.

15. The tool holder according to claim 14, wherein the device is disposed longitudinally between the tool and the drive means such that the device permits relative longitudinal motion between the tool and drive means.

16. The tool holder according to claim 14, wherein the force applying means includes a first sealed cavity defined in part by the tool shaft assembly and a second sealed cavity defined in part by the tool shaft assembly, the first sealed cavity in fluid communication with a first source of pressurized fluid having a pressure $P_1$, the second sealed cavity in fluid communication with a second source of pressurized fluid having a pressure $P_2$, wherein the cavities share a common cavity wall disposed in a fixed relationship to the tool shaft assembly, wherein the work force is proportional to the differential pressure between the two sealed cavities, wherein contact between the tool and object being worked upon produces a reactive force, and wherein the axial position of the tool depends upon the difference between the work force and the reactive force.

17. The tool holder according to claim 16, wherein the device is disposed longitudinally between the tool and the drive means such that the device permits relative longitudinal motion between the tool and drive means.

18. The tool holder according to claim 14, further including releasable attachment means adapted to attach the device to the controller such that in an attached position the tool shaft assembly engages the drive shaft, wherein the attachment means may be released such that the device is removable from the controller to permit engagement of the tool directly to the controller.

19. The tool holder according to claim 16, further including releasable attachment means adapted to attach the device to the controller such that in an attached position the tool shaft assembly engages the drive shaft, wherein the attachment means may be released such that the device is removable from the controller to permit engagement of the tool directly to the controller.

* * * * *